US011610126B1

(12) United States Patent  
Heckerman et al.

(10) Patent No.: US 11,610,126 B1  
(45) Date of Patent: Mar. 21, 2023

(54) TEMPORAL-CLUSTERING INVARIANCE IN IRREGULAR TIME SERIES DATA

(71) Applicant: Amazon Technologies, Inc., Seattle, WA (US)

(72) Inventors: David Heckerman, Bellevue, WA (US); Mohammad Taha Bahadori, Seattle, WA (US); Zachary Chase Lipton, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 909 days.

(21) Appl. No.: 16/447,888

(22) Filed: Jun. 20, 2019

(51) Int. Cl.
G06N 3/00 (2006.01)
G06N 3/084 (2023.01)
G06N 20/10 (2019.01)
G06K 9/62 (2022.01)

(52) U.S. Cl.
CPC ............ G06N 3/084 (2013.01); G06K 9/623 (2013.01); G06K 9/6218 (2013.01); G06K 9/6277 (2013.01); G06N 20/10 (2019.01)

(58) Field of Classification Search
CPC ...... G06N 3/084; G06N 20/10; G06K 9/6218; G06K 9/623; G06K 9/6277
See application file for complete search history.

(56) References Cited

U.S. PATENT DOCUMENTS 11,163,747 B2 * 11/2021 Shahand .............. G06Q 10/063
2010/0063393 A1 * 3/2010 Moradi ............... G01S 7/52036
600/442
2014/0310235 A1 * 10/2014 Chan ..................... G06F 16/285
707/603
2020/0167355 A1 * 5/2020 Rath ................... G06F 16/2433
2021/0256358 A1 * 8/2021 Deng .................... G06N 3/0454

FOREIGN PATENT DOCUMENTS

EP 2698679 A1 * 2/2014 ....... G06F 16/24568

OTHER PUBLICATIONS

Alaa A.M., et al., "Learning from Clinical Judgments: Semi-Markov-Modulated Marked Hawkes Processes for Risk Prognosis," Proceedings of the 34th International Conference on Machine Learning, downloaded from https://arxiv.org/abs/1705.05267v1, May 15, 2017, 16 pages.
Bahadori M.T., et al., "Temporal-Clustering Invariance in Irregular Healthcare Time Series," downloaded from the Internet: https://arxiv.org/abs/1904.12206, Apr. 27, 2019, 16 pages.

(Continued)

*Primary Examiner* — Khai M Nguyen
(74) *Attorney, Agent, or Firm* — Nicholson De Vos Webster & Elliott LLP

(57) ABSTRACT

Techniques for generating multiple-resolutions of time series data are described. An input irregular time series having a plurality of data points is obtained, each data point of the plurality of data points including a timestamp and a feature vector. Based on the input irregular time series, multiple variant time series are generated. A data point in one of the variant time series is based in part on a combination of at least two data points of the input irregular time series. The multiple variant time series can then be used for machine learning tasks such as training a machine learning model or using a machine learning model to infer an output.

20 Claims, 10 Drawing Sheets

(56) References Cited

OTHER PUBLICATIONS

Bai S., et al., "An Empirical Evaluation of Generic Convolutional and Recurrent Networks for Sequence Modeling," downloaded from the Internet: https://arxiv.org/abs/1803.01271, Apr. 19, 2018, 14 pages.
Barker J., et al., "Robust ASR Based on Clean Speech Models: An Evaluation of Missing Data Techniques for Connected Digit Recognition in Noise," EUROSPEECH, 2001, 4 pages.
Baytas I.M., et al., "Patient Subtyping via Time-Aware LSTM Networks," KDD '17, ACM, Aug. 13-17, 2017, pp. 65-74.
Ben-Chetrit E., et al., "A Simplified Scoring Tool for Prediction of Readmission in Elderly Patients Hospitalized in Internal Medicine Departments," IMAJ, vol. 14, Dec. 2012, pp. 752-756.
Brutzkus A., et al., "SGD Learns Over-Parameterized Networks that Provably Generalize on Linearly Separable Data," ICLR, 2018, 17 pages.
Che Z., et al., "Hierarchical Deep Generative Models for Multi-Rate Multivariate Time Series," International Conference on Machine Learning, PMLR 80, 2018, pp. 783-792.
Che Z., et al., "Recurrent Neural Networks for Multivariate Time Series with Missing Values," Scientific Report: 8 (Article No. 6085), Apr. 17, 2018, 12 pages.
Cho K., et al., "Learning Phrase Representations using RNN Encoder-Decoder for Statistical Machine Translation," EMNLP, downloaded from the Internet: https://arxiv.org/abs/1406.1078v3, Sep. 3, 2014, 15 pages.
Choi E., et al., "Doctor AI: Predicting Clinical Events via Recurrent Neural Networks," Proceedings of Machine Learning for Healthcare, JMLR W&C Track vol. 56, 2016, pp. 301-318.
Cohen T., et al., "Group Equivariant Convolutional Networks," 2016, Proceedings of the 33rd International Conference on Machine Learning, JMLR: W&CP vol. 48, downloaded from the Internet: https://arxiv.org/abs/1602.07576v3, Jun. 3, 2016, 12 pages.
Dai A.M., et al., "Semi-supervised Sequence Learning," NIPS, downloaded from the Internet: https://arxiv.org/abs/1511.01432, Nov. 4, 2015, pp. 3079-3087.
Fiete I.R., et al., "Neural Network Models of Birdsong Production, Learning, and Coding," New Encyclopedia of Neuroscience, Elsevier, Oct. 17, 2007, 19 pages.
Futoma J., et al., "An Improved Multi-Output Gaussian Process RNN with Real-Time Validation for Early Sepsis Detection," Proceedings of Machine Learning for Healthcare, JMLR W&C Track vol. 68, 2017, pp. 243-254.
Gens R., et al., "Deep Symmetry Networks," Advances in Neural Information Processing systems, downloaded from the Internet: https://papers.nips.cc/paper/5424-deep-symmetry-networks, 2014, pp. 2537-2545.
Goodfellow I.J., et al., "Explaining and Harnessing Adversarial Examples," ICLR 2015, downloaded from the Internet: https://arxiv.org/abs/1412.6572v1, Dec. 20, 2014, 10 pages.
Gruneir A., et al., "Unplanned Readmissions after Hospital Discharge Among Patients Identified as Being at High Risk for Readmission Using a Validated Predictive Algorithm," Open Medicine, vol. 5 (2):E, May 31, 2011, pp. 104-111.
Harutyunyan H., et al., "Multitask Learning and Benchmarking with Clinical Time Series Data," Proceedings of the ACM Conference, Conference'17, downloaded from the Internet: https://arxiv.org/abs/1703.07771, Mar. 22, 2017, 11 pages.
He K., et al., "Deep Residual Learning for Image Recognition," downloaded from the Internet: https://arxiv.org/abs/1512.03385, Dec. 10, 2015, 12 pages.
Hochreiter S., et al., "Long Short-Term Memory," Neural Computation, vol. 9 (8):1735-1780, 1997, 32 pages.
Islam K.T., et al., "Marked Point Process for Severity of Illness Assessment," Proceedings of Machine Learning for Healthcare, JMLT W&C Track vol. 68, 2017, pp. 255-270.
Ji Y., et al., "A Latent Variable Recurrent Neural Network for Discourse Relation Language Models," Proceedings of NAACL-HLT, Scientific data, Jun. 12-17, 2016, pp. 332-342.
Johnson A.E.W., et al., "MIMIC-III, A Freely Accessible Critical Care Database," Scientific data, 3:160035, https://www.nature.com/articles/sdata201635, May 24, 2016, 9 pages.
Keogh E., et al., "Exact Indexing of Dynamic Time Warping," Springer-Verlag London Ltd, Knowledge and Information Systems (2005), vol. 7, May 13, 2004, pp. 358-386.
Kingma D.P., et al., "Adam: A Method for Stochastic Optimization," ICLR 2015, downloaded from the Internet: https://arxiv.org/abs/1412.6980, Dec. 22, 2014, 9 pages.
Klein J.P., et al., "Survival Analysis Techniques for Censored and Truncated Data," Statistics for Biology and Health, Springer Science & Business Media, Second Edition, 2006, 542 pages.
Kondor R., et al., "On the Generalization of Equivariance and Convolution in Neural Networks to the Action of Compact Groups," Proceedings of the 35th International Conference on Machine Learning, PMLR 80, downloaded from the Internet: https://arxiv.org/abs/1802.03690v3, Nov. 10, 2018, 14 pages.
Kooi T., et al., "Classifying Symmetrical Differences and Temporal Change for the Detection of Malignant Masses in Mammography using Deep Neural Networks," Journal of Medical Imaging, vol. 4 (4), Oct.-Dec. 2017, pp. 044501-1 to 044501-9.
Krizhevsky A., et al., "ImageNet Classification with Deep Convolutional Neural Networks," NIPS, Dec. 3-6, 2012, pp. 1097-1105.
Li S.C., et al., "Classification of Sparse and Irregularly Sampled Time Series with Mixtures of Expected Gaussian Kernels and Random Features," UAI, Jan. 2015, pp. 484-493.
Lipton Z.C., et al., "Learning to Diagnose With LSTM Recurrent Neural Networks," ICLR 2016, Downloaded from the Internet: https://arxiv.org/abs/1511.03677, Mar. 21, 2017, 18 pages.
Lipton Z.C., et al., "Modeling Missing Data in Clinical Time Series with RNNs," 2016, Proceedings of Machine Learning for Healthcare, JMLR W&C Track vol. 56, downloaded from the Internet: https://arxiv.org/abs/1606.04130, Nov. 11, 2016, 17 pages.
Ma F., et al., "Dipole: Diagnosis Prediction in Healthcare via Attention-based Bidirectional Recurrent Neural Networks," KDD'17, Applied Data Science Paper, ACM, Aug. 13-17, 2017, pp. 1903-1911.
Moore J.M., et al., "Motor Pathway Convergence Predicts Syllable Repertoire Size in Oscine Birds," PNAS, vol. 108 (39), Sep. 27, 2011, pp. 16440-16445.
Ng J.Y., et al., "Beyond Short Snippets: Deep Networks for Video Classification," CVPR, downloaded from the Internet: https://arxiv.org/abs/1503.08909, Apr. 13, 2015, pp. 4694-4702.
Nguyen P., et al., "Deepr: A Convolutional Net for Medical Records," IEEE Journal of Biomedical and Health Informatics, 2017, Downloaded from the Internet: https://arxiv.org/abs/1607.07519, Jul. 26, 2016, pp. 22-30.
Oh J., et al., "Learning to Exploit Invariances in Clinical Time-Series Data using Sequence Transformer Networks," Machine Learning for Healthcare, Proceedings of Machine Learning Research, downloaded from the Internet: https://arxiv.org/abs/1808.06725, Aug. 21, 2018, 15 pages.
Oord A.V.D., et al., "WaveNet: A Generative Model for Raw Audio," 9th ISCA Speech Synthesis Workshop, Sep. 13-15, 2016, p. 125.
Paszke A., et al., "Automatic differentiation in PyTorch," 31st Conference on Neural Information Processing Systems (NIPS-W), 2017, 4 pages.
Razavian N., et al., "Temporal Convolutional Neural Networks for Diagnosis From Lab Tests," ICLR 2016, downloaded from the Internet: https://arxiv.org/abs/1511.07938, Nov. 25, 2015, 11 pages.
Reddi S.J., et al., "On the Convergence of Adam and Beyond," ICLR 2018, Submitted on the Internet: https://arxiv.org/abs/1904.09237, Apr. 19, 2019, 23 pages.
Sakoe H., et al., "Dynamic Programming Algorithm Optimization for Spoken Word Recognition," IEEE Transactions on Acoustics, Speech and Signal Processing, vol. ASSP-26 (1), Feb. 1978, pp. 43-49.

(56) References Cited

OTHER PUBLICATIONS

Schmidhuber J, "Long Short-Term Memory: 2003 Tutorial on LSTM Recurrent Nets," IDSIA, retrieved from the Internet: www.idsia.ch, 2003, 60 pages.

Shukla S.N., et al., "Interpolation-Prediction Networks for Irregularly Sampled Time Series," ICLR 2019, downloaded from the Internet: https://github.com/mlds-lab/interp-net, 14 pages.

Shukla S.N., et al., "Modeling Irregularly Sampled Clinical Time Series," Machine Learning for Health (ML4H) Workshop at NeurIPS, downloaded from the Internet: https://arxiv.org/abs/1812.00531, Dec. 3, 2018, 7 pages.

Siegelmann H., et al., "On the Computational Power of Neural Nets," Journal of Computerand System Sciences, vol. 50 (1), 1995, pp. 132-150.

Soleimani H., et al., "Treatment-Response Models for Counterfactual Reasoning with Continuous-time, Continuous-valued Interventions," In Proceedings of the Thirty-Third Conference on Uncertainty in Artificial Intelligence (UAI-2017), downloaded from the Internet: https://arxiv.org/abs/1704.02038, Nov. 5, 2017, 11 pages.

Song H., et al., "Attend and Diagnose: Clinical Time Series Analysis Using Attention Models," The Thirty-Second AAAI Conference on Artificial Intelligence (AAAI-18), 2018, pp. 4091-4098.

Srivastava N., et al., "Dropout: A Simple Way to Prevent Neural Networks from Overfitting," Journal of Machine Learning Research, vol. 15 (1), Jun. 2014, pp. 1929-1958.

Tran T., et al., "A Framework for Feature Extraction from Hospital Medical Data with Applications in Risk Prediction," BMC Bioinformatics, vol. 15 (1):425, Dec. 30, 2014, 9 pages.

Tsipras D., et al., "Robustness May be at Odds with Accuracy," downloaded from the Internet: https://arxiv.org/abs/1805.12152, Oct. 11, 2018, 24 pages.

Vintsyuk T.K., "Speech Discrimination by Dynamic Programming," Cybernetics, vol. 4 (1), 1968, pp. 52-53.

Walraven C.V., et al., "Derivation and Validation of an Index to Predict Eady Death or Unplanned Readmission after Discharge from Hospital to the Community," CMAJ, vol. 182 (66), Apr. 6, 2010, pp. 551-557.

Walraven C.V., et al., "Lace+ Index: Extension of a Validated Index to Predict Early Death or Urgent Readmission after Hospital Discharge using Administrative Data," Open Medicine, vol. 6 (3), Jul. 19, 2012, pp. e90-e100.

Xiao S., et al., "Modeling The Intensity Function o Point Process Via Recurrent Neural Networks," 2017, Association for the Advancement of Artificial Intelligence, downloaded from the Internet: https://arxiv.org/abs/1705.08982, vol. 17, May 24, 2017, 8 pages.

Yang Z., et al., "Breaking The Softmax Bottleneck: A High-Rank RNN Language Model," ICLR 2018, downloaded from the Internet: https://arxiv.org/abs/1711.03953, Mar. 2, 2018, 18 pages.

Zheng K., et al., "Capturing Feature-Level Irregularity in Disease Progression Modeling," Session 8D: Health Analytics 2/ Top-k, CIKM'17, ACM, Nov. 6-10, 2017, pp. 1579-1588.

Zheng K., et al., "Resolving the Bias in Electronic Medical Records," KDD'17, Applied Data Science Paper, ACM, Aug. 13-17, 2017, pp. 2171-2180.

\* cited by examiner

TEMPORAL-CLUSTERING INVARIANCE IN IRREGULAR TIME SERIES DATA

BACKGROUND

While common sequence-based machine learning challenges, e.g., in natural language processing and speech, typically consist of evenly-spaced data inputs, many real-world problems present as irregular multivariate time series. In healthcare, the natural sciences, and many other fields, data often comes in the form of time series with many variables sampled at irregular intervals resulting in non-uniformly-spaced timestamps. Some popular sequence learning models are based on recurrent neural networks that rely on inputs discretized time steps, with no agreed-upon out-of-the-box method for handling irregular time series.

BRIEF DESCRIPTION OF DRAWINGS

Various embodiments in accordance with the present disclosure will be described with reference to the following drawings.

DETAILED DESCRIPTION

Researchers analyzing irregular time series data with machine learning ("ML") models have few, if any, agreed upon techniques for handling the irregularities. To date, deep learning researchers have relied on heuristic tricks, such as ignoring the timestamp information and manual feature extraction. These tricks fail to exploit invariances in events in the data that might hold independent of the relative timing of events. For example, in the healthcare context, suppose a patient visits a hospital for an emergency service and undergoes a set of operations. Had the patient visited a smaller clinic, the patient might have undergone only a subset of those operations and the rest would have been done at a later time in another clinic. The first scenario would result in a single event in the patient's records, while the second scenario would result in two or more events. Similar patterns of variances may be introduced due to the timing of the admission, insurance policies, or other factors related to the patient's convenience. An ML model may process the patient's health record to predict the occurrence of a disease, for example. Ideally, the ML model should be robust to the variances in the timing of events. However, determining a good way to exploit timing variances is not straightforward, and discarding information can be problematic. For example, the frequency of visits is often informative about the severity of illness and a model should be able to use timing in its analysis.

Various embodiments of methods, apparatus, systems, and non-transitory computer-readable storage media for generating multiple variants of irregular time series data for use in ML tasks are described. The variants can be used for ML training and inference tasks. For example, the approaches disclosed herein can be used during model training to expand the dataset used during training (sometimes referred to as data augmentation). As another example, the approaches disclosed herein can be used during inference to generate an ensemble of inputs to be processed by a model. These approaches provide several benefits, including reducing the risk of model overfitting during training and improved performance during inference. In a predictive setting, for example, approaches disclosed herein can yield models that produce more accurate predictions and demonstrate greater robustness to variations in the temporal-clustering of the data. Approaches to variant generation disclosed herein include deterministic and stochastic coarsening techniques that can generate multiple variants of an irregular time series.

Figure 1A:
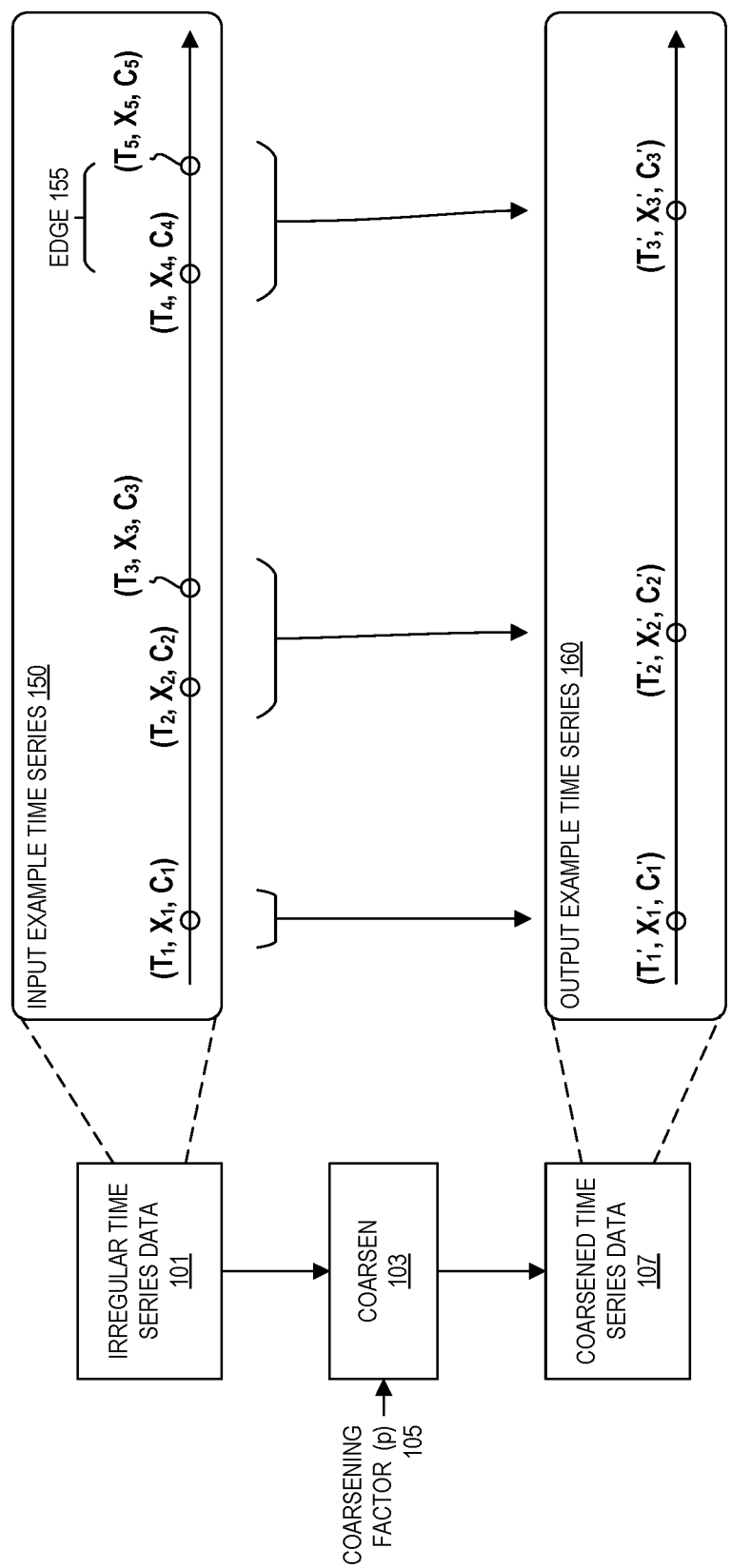
FIGS. 1A and 1B are diagrams of an exemplary approaches to coarsening irregular time series data according to some embodiments of the present disclosure.
Figure 1B:
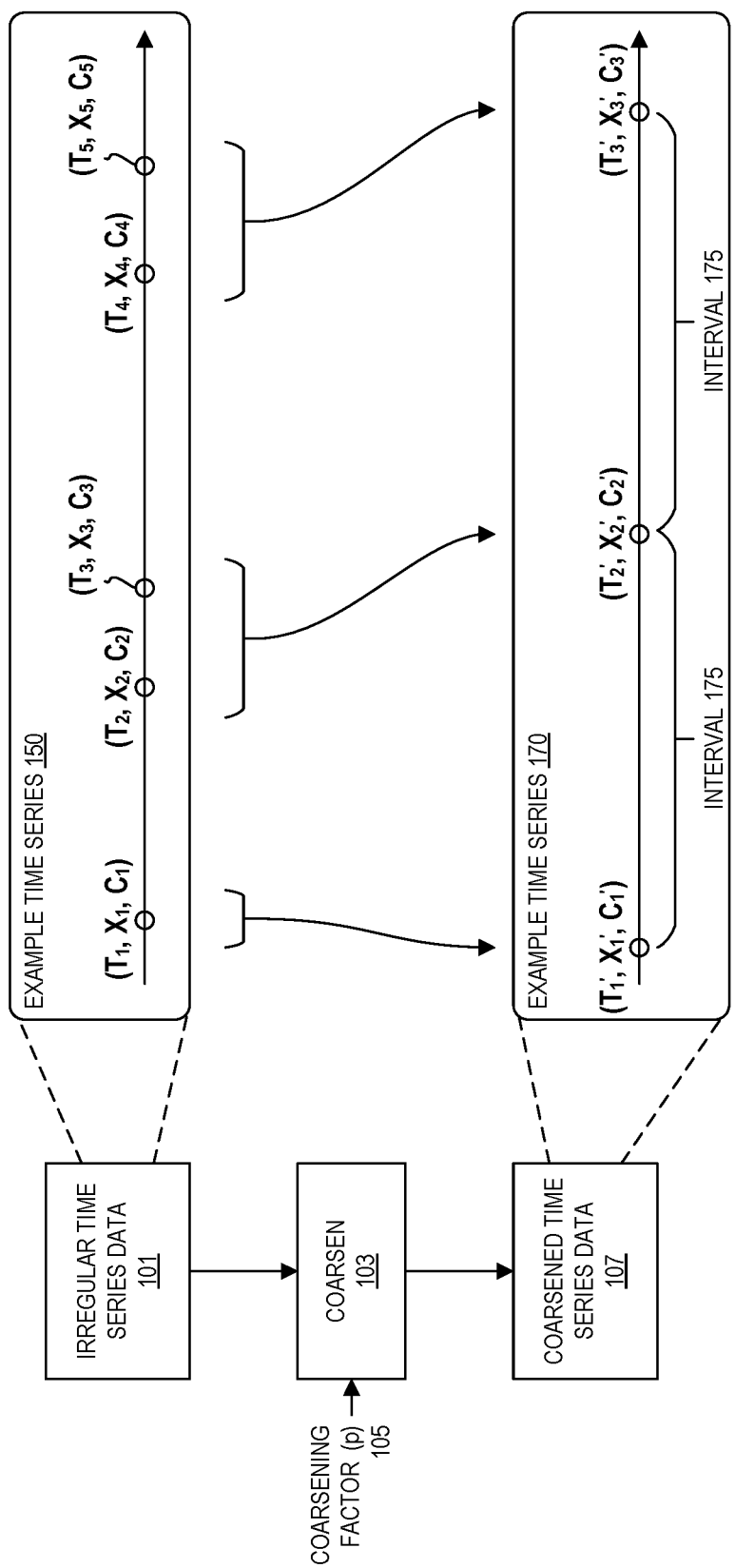

FIGS. 1A and 1B are diagrams of an exemplary approaches to coarsening irregular time series data according to some embodiments of the present disclosure. As illustrated in FIG. 1A, a coarsen 103 process (sometimes referred to as downsampling) takes as inputs an irregular time series data 101 (sometimes referred to simply as "time series" or "time series data") and a coarsening factor (p) 105 (sometimes referred to as a clustering factor) and generates a coarsened time series data 107. In general, irregular time series have data points at times without constant spacing. Irregular time series are sometimes referred to as unevenly spaced time series. To conceptually illustrate the coarsen 103 process, FIG. 1 shows an input example time series 150 and an output example time series 160. By way of nomenclature, each data point in a time series of T data points is referenced as a tuple $(t_i, x_i, c_i)$ where $t_i$ is the timestamp of an event, $x_i$ is a feature vector associated with the event, and $c_i$ is the number of events associated with the timestamp (in the case where the time series is an input, $c_i$ can be initialized to '1' for each event).

The feature vector $x_i$ can be an r-dimensional vector where r is the number of variables in the data. To put the tuple in real world terms, in the healthcare context an example time series may be a patient's health record, timestamps may be associated with patient visits, tests, or operations, and the feature vector can include results of those events. Note that some data in the feature vector may be missing for a given timestamp (e.g., if an event is a lab test result, the feature vector may include the result of that test as one of the variables while the other variables are empty, null, or the like.)

As illustrated, the input example time series 150 includes five tuples (e.g., $(t_1, x_1, c_1=1)$, $(t_2, x_2, c_2=1)$, $(t_3, x_3, c_3=1)$, $(t_4, x_4, c_4=1)$, $x_s, c_5=1)$). The coarsen 103 process clusters zero or more tuples based on the coarsening factor 105. Here, the coarsen 103 process employs a clustering algorithm to generate the output example time series 160 that includes three tuples (e.g., $(t_1', x_1', c_1'=1)$, $(t_3', x_3', c_3'2=2)$, and ($t_3'$, $x_3'$, $c_3'$=2)) where the tuples with timestamps $t_2$ and $t_3$ and with timestamps $t_4$ and $t_5$ were clustered. Algorithm 1, below, shows in pseudo-code an exemplary coarsening algorithm employed by the coarsen 103 process to perform clustering as illustrated in FIG. 1A.

---
ALGORITHM 1
---

1. Input: example sequence $\{(t_i, x_i, c_i)\}_{i=1}^{T}$, clustering factor p
2. Output: transformed sequence $\{(t_i', x_i', c_i')\}_{i=1}^{T'}$ where T' ≤ T
3. T' ← [p · T]
4. Create clusters $C_{i'}$ for i' = 1, ..., T' by clustering $\{t_i\}_{i=1}^{T}$ into T' clusters (e.g., using k-means)
5. for i' = 1 to T' do
6.     $t_{i'}'$ ← mean(t: t ∈ $C_{i'}$)
7.     $x_{i'}'$ ← mean(x: x ∈ $C_{i'}$)
8.     $c_{i'}'$ ← sum(c: c ∈ $C_{i'}$)
9. end for
10. Return: transformed sequence $\{(t_i', x_i', c_i')\}_{i=1}^{T'}$

---

As can be seen, Algorithm 1 takes as inputs a time series with T data points represented using the above nomenclature and a coarsening factor 105 and outputs a coarsened time series with T' data points. In this example, per line 3, the coarsening factor 105 is in the range (0, 1) where a value of '1' would output the input (e.g., T'=T), a value of 0.5 would output a time series with approximately half of the data points as the input, etc. Per line 4, Algorithm 1 clusters data points in the input time series based on timestamps. An exemplary clustering technique is k-means clustering, although other clustering algorithms may be used. Per lines 5-9, Algorithm 1 combines each of the clustered tuples in the input to create a tuple in the output. In this example, Algorithm 1 combines the clustered tuples in the input with a mean of each of the timestamps in the cluster (e.g., mean(t: t∈$C_{i'}$)), a mean of the feature vectors in the cluster (e.g., mean(x: x∈$C_{i'}$)), and a sum of the number of events in the cluster (e.g., sum(c: c∈$C_{i'}$)). Other forms of combining data besides a mean or sum may be used. For example, the timestamp and/or feature vector of the new data point could take on the minimum, maximum, or some parameterized function of the respective values in the clustered data points (e.g., $t_2'$=max($t_2$, $t_3$); $x_3'$=(a·$x_4$+b·$x_5$)/2 where a and b are weights that may or may not be learned through model training). In combining clustered feature vectors, the combining may be per-feature. For example, if $x_i$ is an r-dimensional feature vector, $x_i'[1]$=mean($x_i[1]$:x∈$C_{i'}$, ... $x_i'[r]$=mean($x_i[r]$: x∈$C_{i'}$. Missing data in feature vectors being combined may be ignored (e.g., if three tuples are clustered but only two have a particular feature in the feature vector, the mean can be of the two present features).

In some embodiments, the count of events, $c_i'$, may be omitted from the output of the coarsen 103 process, but including it can give a downstream ML model a feature indicative of the number of data points in the input time series data that were combined into a data point of the output time series data. Furthermore, in some embodiments, the count of events $c_i$ in the input tuple may be omitted or assumed to be 1 by the coarsen 103 process. In some embodiments, the count of events may be a vector of size corresponding to the feature vector $x_i$, where the value in a position of the count vector corresponds to the number of events combined in the feature vector to account for missing data in the feature vector. For example, if a feature vector (0.5, 12, 1) is the result of combining two feature vectors $x_a$=(0, 12, 1) and $x_a$=(1, null, 1), the corresponding count vector could be (2,1,2) to indicate the middle value was based on a single value rather than a combination of two values.

Due to the computational complexity of clustering, in some embodiments the coarsen 103 process can perform a stochastic clustering to improve the performance of the coarsen 103 process. Algorithm 2, below, shows in pseudo-code an exemplary coarsening algorithm employed by the coarsen 103 process to perform clustering that requires less computational overhead as compared to Algorithm 1.

---
ALGORITHM 2
---

1. Input: example sequence $\{(t_i, x_i, c_i)\}_{i=1}^{T}$, largest clustering factor $p_{high}$, whether weighted or unweighted
2. Output: transformed sequence $\{(t_i', x_i', c_i')\}_{i=1}^{T'}$ where T' ≤ T
3. if weighted then
4.     Δ ← [$t_2 - t_1$, ..., $t_T - t_{T-1}$]
5.     $\tilde{p}_\Delta$ ← [$1/\Delta_1$, ..., $1/\Delta_{T-1}$]
6.     $p_\Delta = \tilde{p}_\Delta/(1^T\tilde{p}_\Delta)$
7. else
8.     $p_\Delta$ ← $1_{T-1}/(T-1)$
9. end if
10. Draw p~Unif(0,$p_{high}$)
11. E ← [p · T] samples without replacement from Multinomial $p_\Delta$
12. Create clusters $C_{i'}$ for i' = 1, ..., T' by assigning every pair (i, i + 1) to the same cluster if i ∈ E
13. for i' = 1 to T' do
14.     $t_{i'}'$ ← mean(t: t ∈ $C_{i'}$)
15.     $x_{i'}'$ ← mean(x: x ∈ $C_{i'}$)
16.     $c_{i'}'$ ← sum(c: c ∈ $C_{i'}$)
17. end for
18. Return: transformed sequence $\{(t_i', x_i', c_i')\}_{i=1}^{T'}$

---

As can be seen, Algorithm 2 takes as inputs a time series with T data points represented using the above nomenclature and a coarsening factor 105 and outputs a coarsened time series with T' data points. In this example, per lines 11-12, Algorithm 2 selects [p·T] edges, E, between tuples (e.g., edge 155 in FIG. 1) from the Multinomial $p_\Delta$ and clusters the data points (i,i+1) that bookend the selected edges. For example, if the edge between the data point for i=1 and i=2, those two data points are combined into a single data point in the output time series. As another example, if the edges between the data point for i=2 and i=3 and for data point for i=3 and i=4 are selected, those three data points are combined into a single data point in the output time series. Per line 10, Algorithm 2 may randomly select p from between 0 the coarsening factor 105 in some embodiments. Per lines 3-9, Algorithm 2 may optionally bias which edges are selected by weighting multinomial $p_\Delta$ based on the closeness of the timestamps, in some embodiments. Per lines 13-17, Algorithm 2 combines each of the clustered tuples in the input to create a tuple in the output as described above for lines 5-9 of Algorithm 1.

An alternative approach to Algorithms 1 and 2 is to regularize the irregular time series data as illustrated in FIG. 1B. As illustrated, a coarsen 103 process takes as inputs an irregular time series data 101 and a coarsening factor (p) 105 and generates a coarsened time series data 107. Under this approach, the output coarsened time series data 107 is regularized such that tuples within the time series are spaced at regular intervals 175.

Again, the input example time series 150 includes five tuples (e.g., ($t_1$, $x_1$, $c_1$=1), ($t_2$, $x_2$, $c_2$=1), ($t_3$, $x_3$, $c_3$=1), ($t_4$, $x_4$, $c_4$=1), ($t_5$, $x_5$, $c_5$=1)). The coarsen 103 process clusters zero or more tuples based on the coarsening factor 105. Here, the coarsen 103 process employs a clustering algorithm to generate the output example time series 170 that includes three tuples (e.g., $(t_1', x_1', c_1'=1)$, $(t_2', x_2', c_2'=2)$, and $(t_3', x_3', c_3'=2)$) where the tuples with timestamps $t_2$ and $t_3$ and with timestamps $t_4$ and $t_5$ were clustered and the timestamps $t_1'$, $t_2'$, and $t_3'$ are at regularly spaced intervals. The coarsened time series data 109 can make subsequent analysis easier due to its regularization. Algorithm 3, below, shows in pseudo-code an exemplary coarsening algorithm employed by the coarsen 103 process to perform clustering as illustrated in FIG. 1B.

---

ALGORITHM 3

---

1. Input: example sequence $\{(t_i, x_i, c_i)\}_{i=1}^T$, clustering factor p, and observation interval $[t_L, t_R]$
2. Output: transformed sequence $\{(t_i', x_i', c_i')\}_{i=1}^{T'}$ where T' ≤ T
3. T' ← [p · T]
4. $t_{i'+1}$ ← $t_L + i \cdot (t_R - t_L)/(T' - 1)$ for i' = 0, ..., T' − 1
5. Initialize clusters $C_{i'}$ = ∅ for i' = 1, ..., T'
6. for i = 1 to T do
7.     i* ← $\operatorname{argmin}_{i'}\{|t_i - t_{i'}'|$ for i' = 1, ..., T'$\}$
8.     $C_{i*}$ ← $C_{i*}$ ∪ $\{(t_i, x_i, c_i)\}$
9. end for
10. for i' = 1 to T' do
11.     $t_{i'}'$ ← mean(t: t ∈ $C_{i'}$)
12.     $x_{i'}'$ ← mean(x: x ∈ $C_{i'}$)
13.     $c_{i'}'$ ← sum(c: c ∈ $C_{i'}$)
14. end for
15. Return: transformed sequence $\{(t_i', x_i', c_i')\}_{i=1}^{T'}$

---

As can be seen, Algorithm 3 takes as inputs a time series with T data points represented using the above nomenclature, optionally an observation interval $[e_L, t_R]$ that defines the earliest and latest tuples in the time series to coarsen, and a coarsening factor 105 and outputs a coarsened time series with T' data points. In this example, per line 3, the coarsening factor 105 is in the range (0, 1) as described herein. Per line 4, Algorithm 3 selects timestamps at regularly spaced intervals. If the entirety of the input time series is to be processed, $t_L$ and $t_R$ can correspond to the first and last timestamps in the input time series. Per line 5, Algorithm 3 initializes clusters for each of the regularized timestamps. Per lines 6-9, Algorithm 3 associates tuples in the input time series with the cluster having the closest regularized timestamp. Per lines 10-14, Algorithm 3 combines each of the clustered tuples in the input to create a tuple in the output as described above for lines 5-9 of Algorithm 1.

Figure 2:
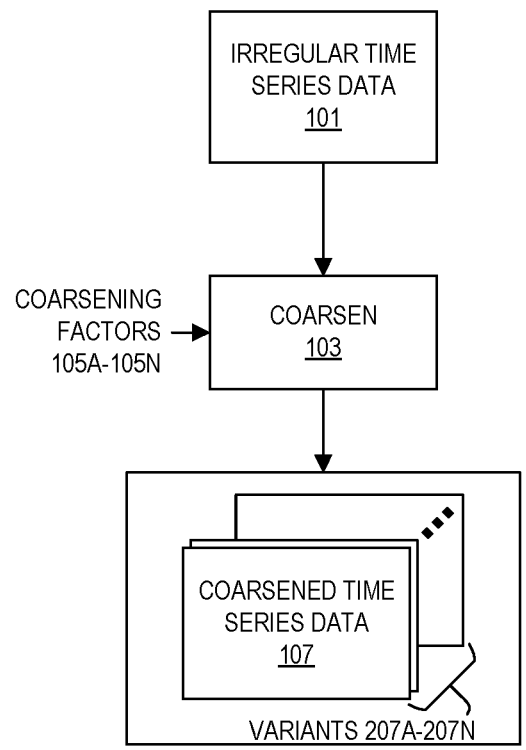
FIG. 2 is a diagram of an approach to generating multiple variants from irregular time series data according to some embodiments of the present disclosure.

FIG. 2 is a diagram of an approach to generating multiple variants from irregular time series data according to some embodiments of the present disclosure. By processing the same irregular time series data 101 with multiple different coarsening factors 105A-105N, the coarsen 103 process can generate a plurality of coarsened variants 207A-207N of the irregular time series data 101. For example, four coarsening factors p=1, ¾, ½, and ¼ can be used to coarsen the input irregular time series data 101 into four variants 207. The four variants 207 include variants downsampled by a factor of ¾, ½, ¼, and, in this case, a variant corresponding to the input irregular time series data 101 (p=1).

In some embodiments, multiple coarsening algorithms can be employed to further increase the number of variants. For example, a coarsen 103 process might apply Algorithm 1 and Algorithm 3 to the input irregular time series data 101 for each coarsening factor 105, resulting in variants 107A-107M where M is 2N.

Figure 3:
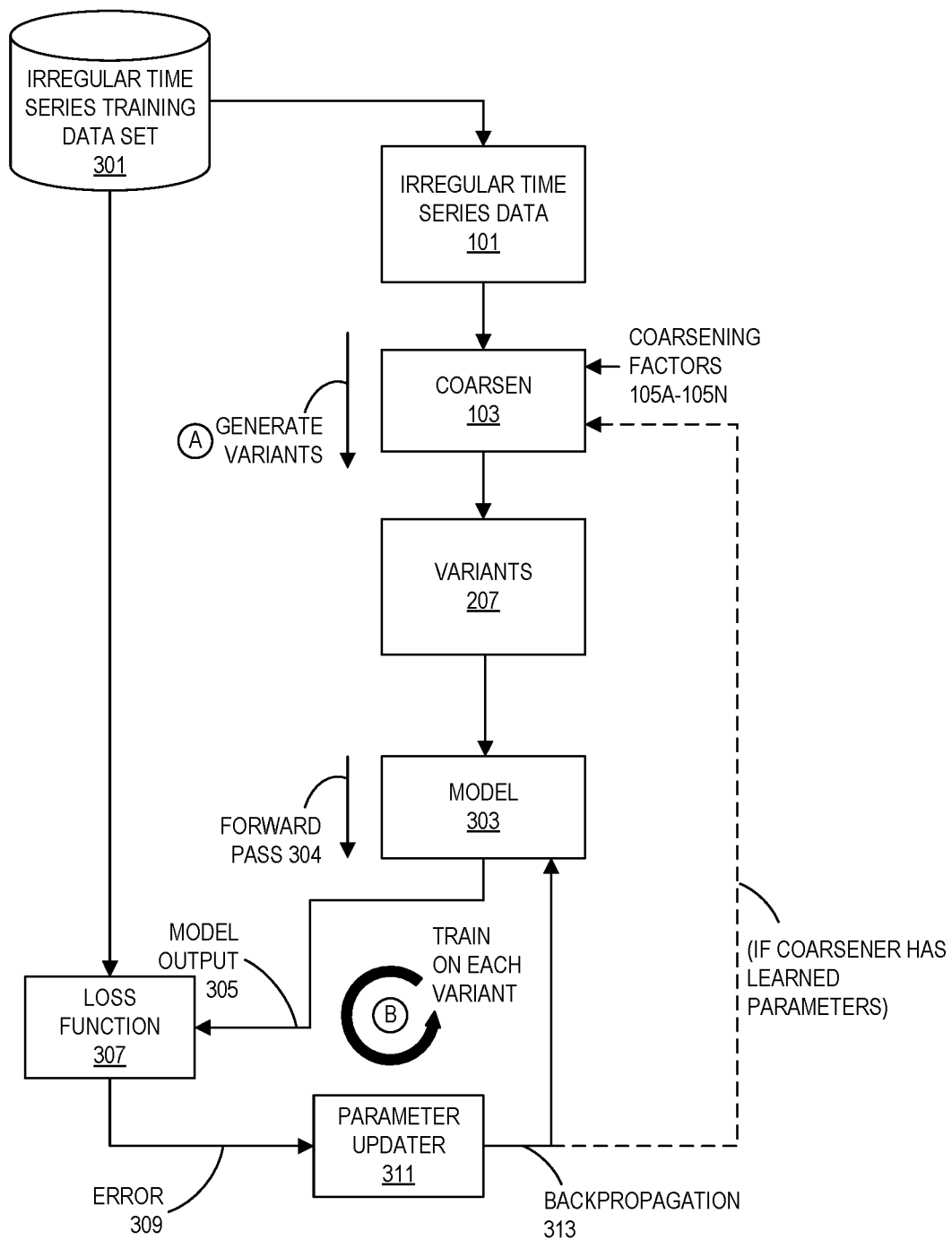
FIG. 3 is a diagram of an approach to training with a machine learning model and coarsened irregular time series data according to some embodiments of the present disclosure.

FIG. 3 is a diagram of an approach to training with an ML model and coarsened irregular time series data according to some embodiments of the present disclosure. The coarsen 103 process provides for data augmentation to increase the amount of training data that can be used when training a neural network ("NN") model. At a high level, training a model is similar to a trail and error process. The model is used to generate a result, the result is compared to an expected result, and the parameters of the model are updated to reduce the difference between the result and the expected result.

As illustrated, a model 303 is being trained using data augmentation by coarsening. An irregular time series training data set 301 includes a plurality of irregular time series and corresponding expected results. For a given irregular time series data 101 in the irregular time series training data set 301, the coarsen 103 process generates a plurality of variants 207 as described herein, as indicated at the encircled letter 'A'. The variants 207 serve as inputs to the model 303. As indicated at the encircled letter for each variant 207, the model 303 generates an output 305, a loss function 307 measures an error 309 between the output 305 and the associated expected result in the irregular time series training data set 301, and a parameter updater 311 calculates the updates to the trainable parameters of the model 303 for backpropagation 313 through the model 303. The updates are based on the error 712 generated by the loss function 710. Through a process known as gradient descent, the parameter updater 715 can calculate updates for each of the trainable parameters based on their relative contribution to the error. As noted above, the coarsen 103 process may have trainable parameters such as weights that are used in combining data points. After training, the trained model 303 and, possible, the trained coarsen 103 process, can be deployed for inference applications.

The model 303 may be any ML model, such as a convolutional neural network ("CNN")-based model, a recurrent neural network ("RNN")-based model, other model types, or some combination thereof. An exemplary CNN-based model first embeds the input variant into a higher dimensional vector. Next, the CNN-based model applies a sequence of convolutional residual blocks with progressively larger dilations to the embedded vector. Finally, the CNN-based model flattens the last hidden tensor and applies a batch normalization layer and dropout layer before generating a final output with a fully connected convolutional layer. An exemplary RNN-based model may employ long short-term memory ("LSTM"), Gated Recurrent Unit ("GRU"), or other recurrent architecture. For example, a RNN-based model may process an input with two GRU layers and then a residual block for prediction, the residual block having the form of relu(bnorm_2(fc_2(relu(bnorm_2(fc_2(x))))))+fc_3 (x), where x is the output of the second GRU layer, fc_refers to a fully connected layer, bnorm_refers to a batch normalization, and relu_refers to a Rectified Linear Unit ("ReLU") activation function.

Using the health care context as an example, an exemplary model may be a classifier that predicts, for example, a diagnosis given a patient's health record (i.e., an irregular time series). The model output 305 may be a vector output from a softmax function where each position in the vector corresponds to a probability of a given diagnoses (e.g., a multilabel classifier). The loss function may be a difference between the model output 305 and a multilabel vector that represents the actual diagnosis/diagnoses of the patient. Another exemplary model may be a model that predicts a patient's length of stay in an intensive care unit given the patient's health record (i.e., an irregular time series).

Figure 4A:
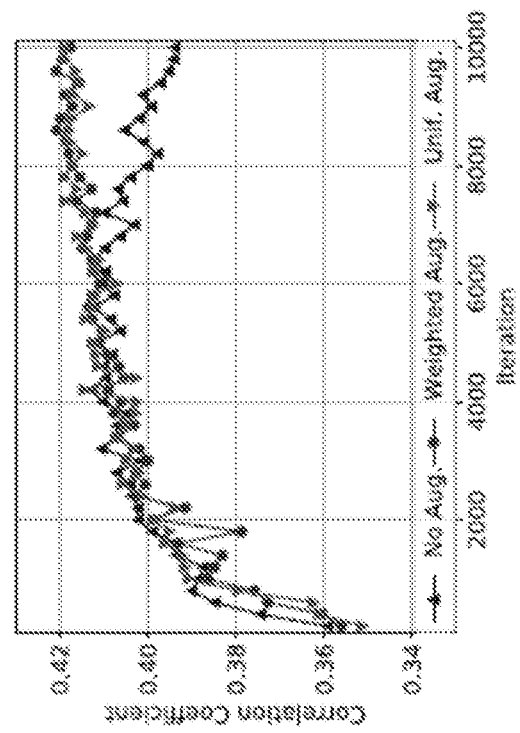
FIGS. 4A-4E are charts that variously illustrate improved characteristics of machine learning models using coarsened irregular time series data according to some embodiments of the present disclosure.
Figure 4B:
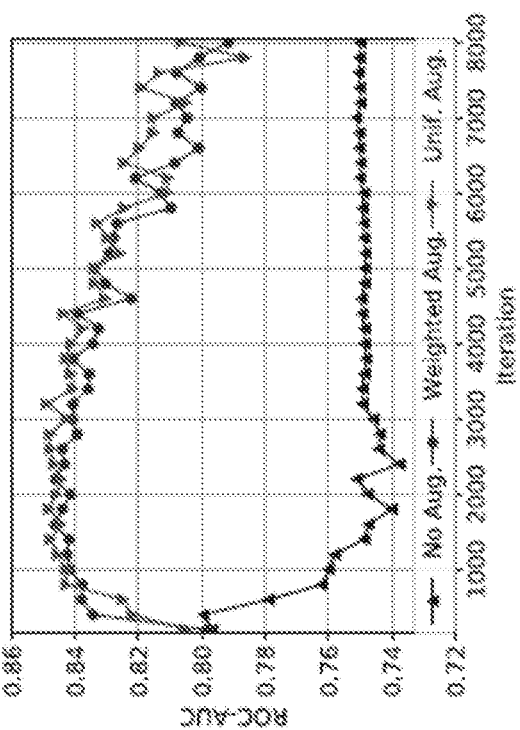
Figure 4C:
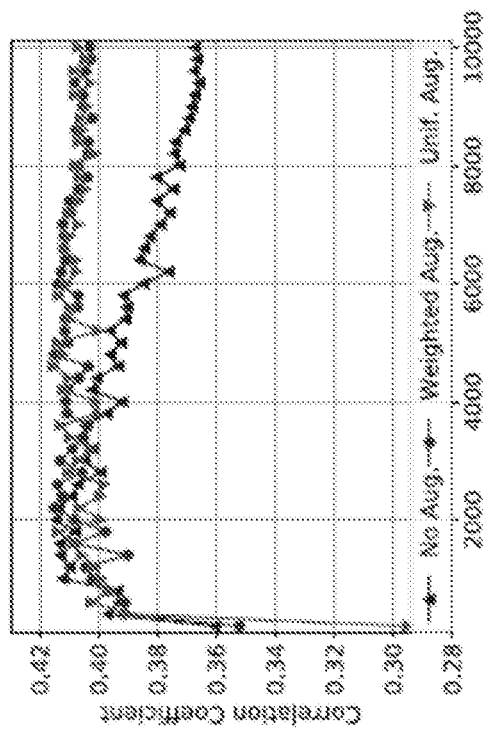
Figure 4D:
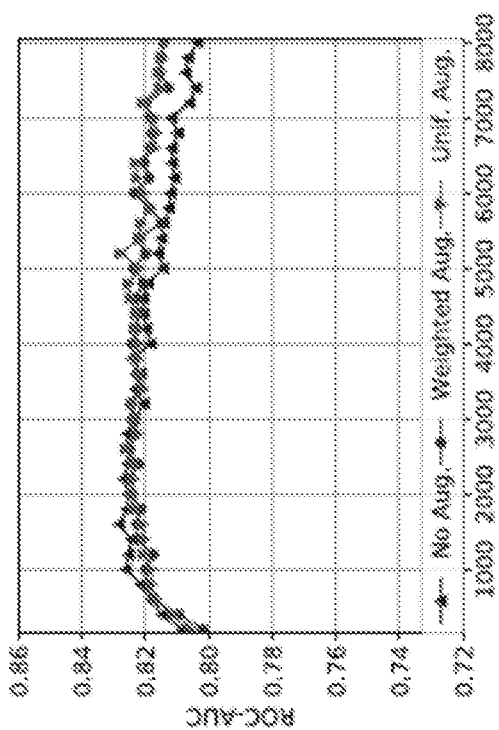

FIGS. 4A-4E are charts that variously illustrate improved characteristics of ML models using coarsened irregular time series data according to some embodiments of the present disclosure. Model overfitting is a risk of training where a model generates expected outputs for the training data set but fails when faced with new inputs. Models trained using the data augmentation techniques disclosed herein exhibit reduced risk of overfitting. In particular, FIGS. 4A-4D illustrate performance metrics of CNN- and RNN-based ML models on a task after training for a variable number of iterations as shown on the x-axis of the charts. FIGS. 4A and 4C illustrate on the y-axis a performance metric—ROC-AUC or Area Under the Curve Receiver Operating Characteristics curve—of a CNN-based model and an RNN-based model, respectively. FIGS. 4B and 4D illustrate on the y-axis another performance metric—a correlation coefficient related to the accuracy of the models—of the CNN-based model and the RNN-based model, respectively. The models were trained with and without data augmentation via coarsening, and, for the coarsening case, with and without weighting using Algorithm 3. The line without data augmentation is denoted by triangles pointing up ("▲"), the line with uniform augmentation is marked by inverted triangles ("▼"), and the line with weighted augmentation is marked by circles ("•"). For both metrics, a higher value indicates better performance. As shown, the models trained with data augmentation outperform the models trained without data augmentation as the number of training iterations increased. In other words, the models trained with data augmentation were less likely to overfit as quickly as the models trained without data augmentation.

Figure 4E:
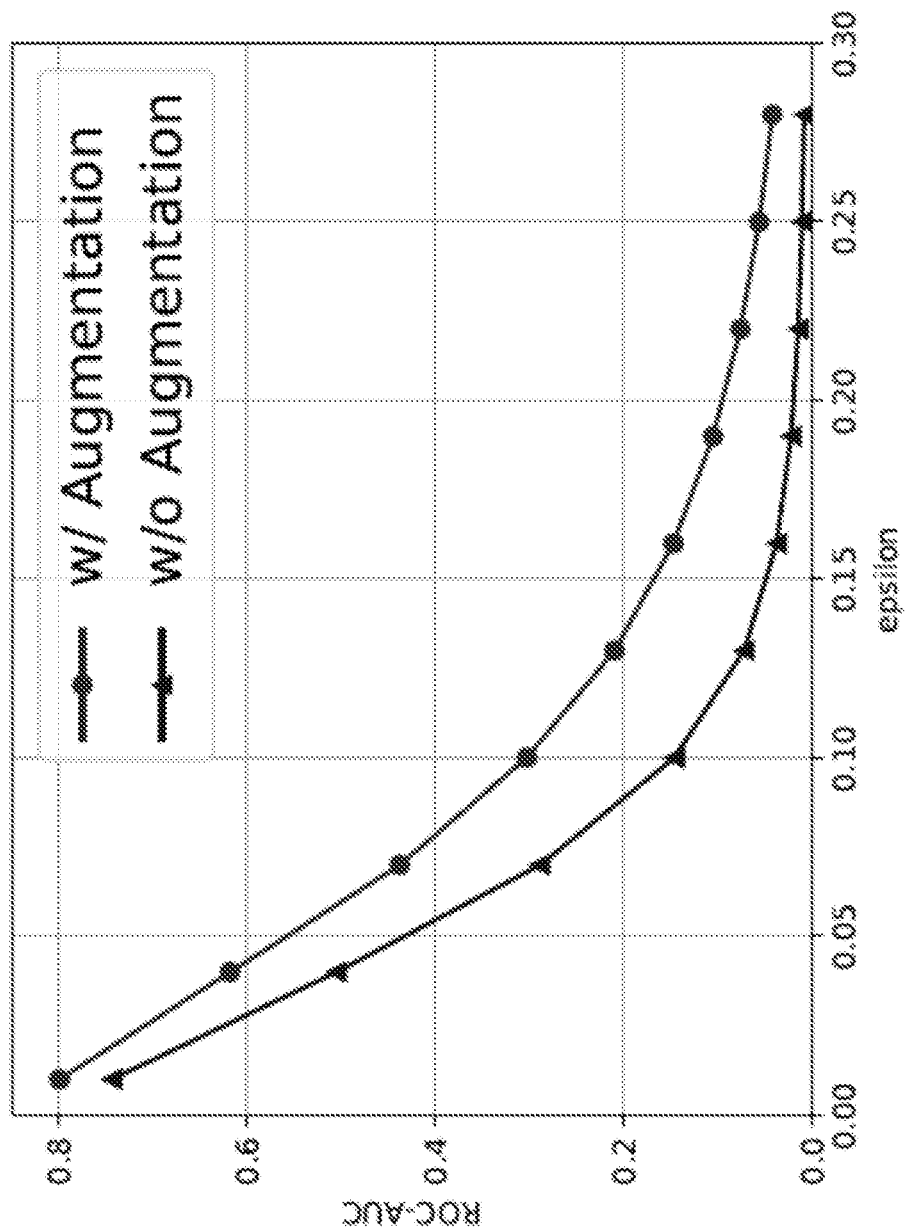

Models trained using the data augmentation techniques disclosed herein can also exhibit increased robustness to variations in the temporal-clustering of the time series data. FIG. 4E illustrates, for a CNN-based model, the ROC-AUC performance metric on the y-axis against an increasing noise factor, E, injected into the data. In particular, the feature vectors were modified according to the following equation for increasing noise factors:

$$\tilde{x} \leftarrow x + \varepsilon \cdot \text{SIN} \frac{\partial L(y, f(x))}{\partial x} \quad [1]$$

where $\tilde{x}$ is the adversarial noise and $f(\cdot)$ and $\partial L(\cdot)$ are the prediction and binary cross-entropy loss functions, respectively. The line without data augmentation is denoted by triangles pointing up ("▲") the line with data augmentation is marked by circles ("•"). As shown, the model exhibits improved performance (higher metric values) when trained using data augmentation.

Figure 5:
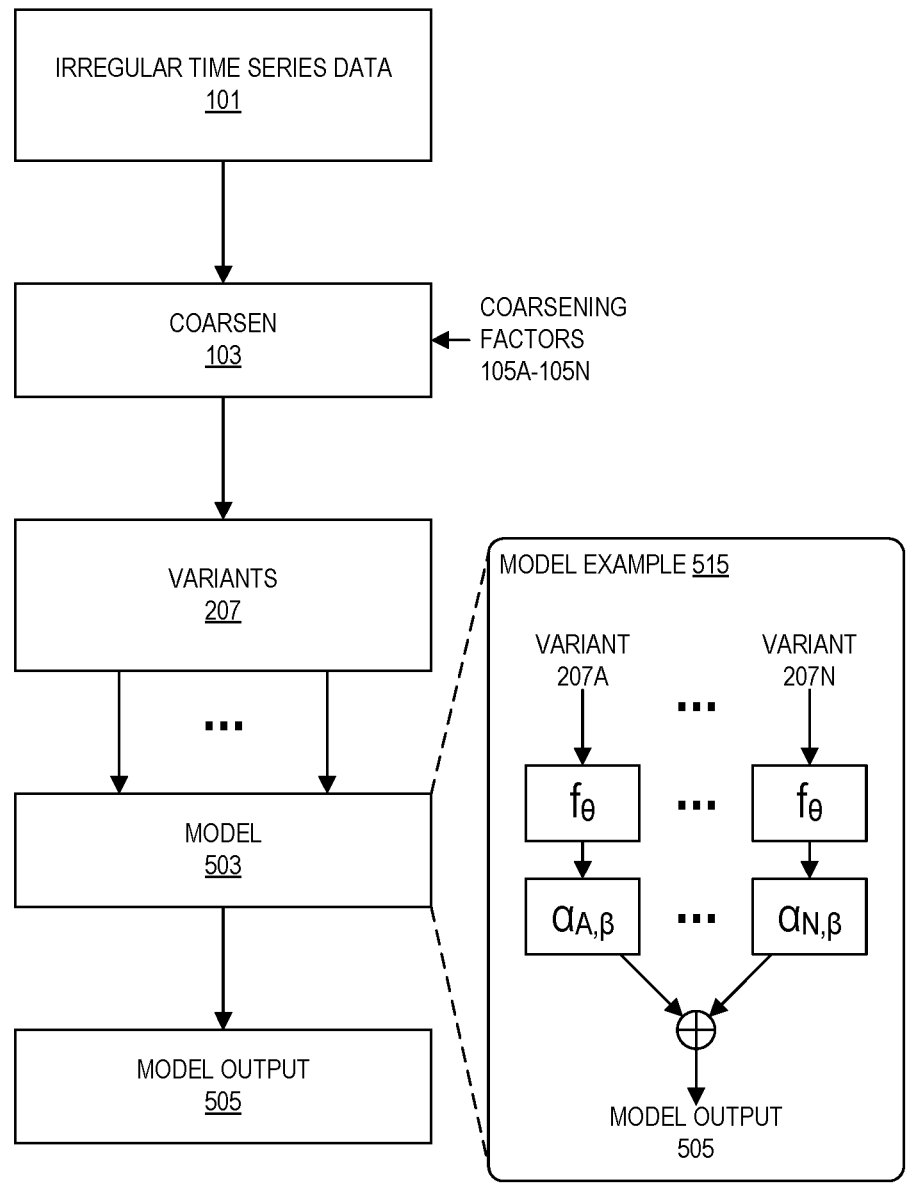
FIG. 5 is a diagram of an approach to inference with a machine learning model and coarsened irregular time series data according to some embodiments of the present disclosure.

FIG. 5 is a diagram of an approach to inference with an ML model and coarsened irregular time series data according to some embodiments of the present disclosure. As illustrated, a model 503 receives variants 207 as inputs and generates a model output 505. The coarsen 103 process generates the variants 207 from the irregular time series data 101 based on the coarsening factors 105A-105N, as described herein. The model 503 may be any neural network model, including those models described above with reference to the model 303. For example, the model 403 can have the following form:

$$g_{\theta,\beta}(X) = \sum_{k=1}^{N} \alpha_{k,\beta}(X) f_\theta(C_{p_k}(X)) \quad [2]$$

where $C_{p_k}(X)$ is the coarsening operator (e.g., the coarsen 103 process), $P_k$ for k=1, ..., N are the coarsening factors 105A-105N, $f_\theta$ is a base learner (e.g., a CNN/RNN neural network), $\alpha_{k,\beta}(X)$ for k=1, ..., N are the attention values, and $g_{\theta,\beta}(X)$ is the model output. For example, the model 503 may be a multilabel classifier where $f_\theta$ is a neural network parameterized by $\theta$ that maps a sequence to probabilities of labels being 1 (e.g., $f_\theta: \mathbb{S}_T \rightarrow [0,1]^s$) and $\alpha_{k,\beta}(X)$ are weights applied to the $f_\theta$ outputs, which may be learned weights from another neural network parameterized by $\beta$.

This model of equation [2] illustrated graphically as model example 515. As illustrated, the variants 207A-207N are processed by the base learner $f_\theta$ and the outputs of the base learners are combined after scaling by the attention values $\alpha_{k,\beta}$. Unlike traditional ensembling techniques where the same input is processed by multiple different models and the outputs are combined to generate a result, the model of equation [2] processes different inputs—variants 207—with the same model. By re-using parameters $\theta$ for the base learner $f_\theta$, $\beta$ are the only new parameters to be trained, reducing the complexity of the training process by avoiding a significant increase in the number of parameters that would correspond to training many different base learners. The model 503 not only benefits from the event-clustering invariance due to processing time series having multiple resolutions, the model 503 is more robust to overfitting during training as described herein. It shares weights across multiple resolutions of time series without a significant increase in the number of parameters.

The model 503 parameters may be trained as a whole or in stages. For example, the base learner $f_\theta$ parameters $\theta$ can be trained as described for the model 303 of FIG. 3. Then, using the trained model $f_\theta$, the parameters $\beta$ of a model that generates the attention values can be trained. With reference to FIG. 3, training the parameters $\beta$ involves a forward pass 304 of multiple variants 207 through the model 503 parameterized by $\theta$ and a backward pass to update the parameters $\beta$ via backpropagation 313. As another example, both the parameters $\theta$ and $\beta$ can be trained simultaneously by processing multiple variants 207 in each forward pass 304.

Figure 6:
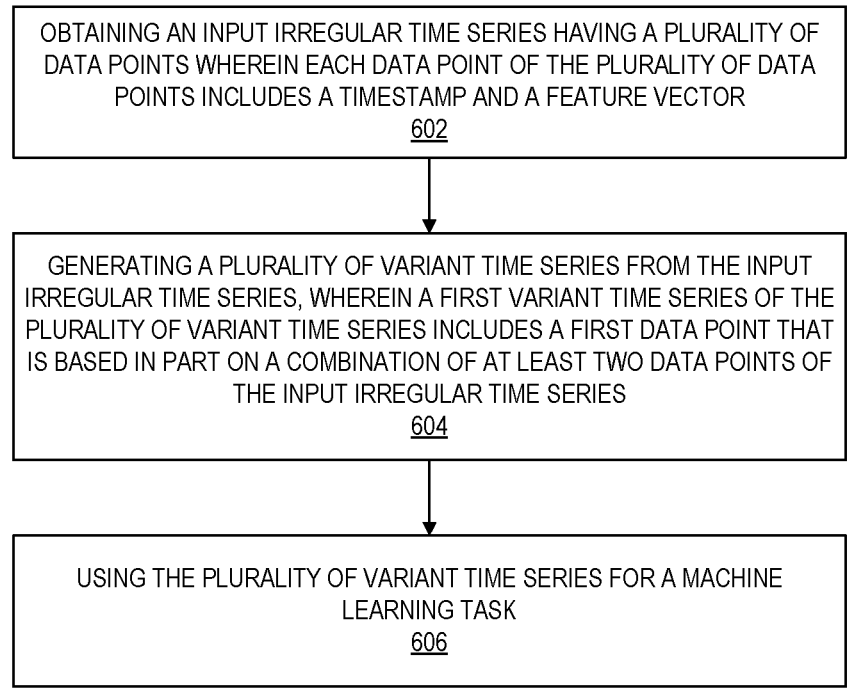
FIG. 6 is a flowchart conceptually illustrating an example method for using coarsened irregular time series data according to some embodiments of the present disclosure.

FIG. 6 is a flowchart conceptually illustrating an example method for using coarsened irregular time series data according to some embodiments of the present disclosure. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a computer system (e.g., the computer system 700, a machine learning service implemented by one or more computer systems of a provider network). While some examples of each of the operations are provided below, other examples of the operations are provided herein.

The operations include, at block 602, obtaining an input irregular time series having a plurality of data points wherein each data point of the plurality of data points includes a timestamp and a feature vector. For example, the coarsen 103 process may be implemented by a computer system and obtain or otherwise receive an input time series (e.g., from another computer system, a memory device, a storage service of a provider network, etc.). As described herein, the time series data can include data points having associated timestamps. The data points may correspond to events and may include one or more features associated with those events that are or can be represented as a feature vector.

The operations further include, at block 604, generating a plurality of variant time series from the input irregular time series, wherein a first variant time series of the plurality of variant time series includes a first data point that is based in part on a combination of at least two data points of the input irregular time series. As described herein, the coarsen 103 process generates variants of the input time series downsampled or coarsened by some factor. For example, an input time series with 100 data points may be reduced to 75 data points, 50 data points, or 25 data points, where the data points of a given variant are based on the data points of the input time series. Various coarsening techniques include those described above with reference to FIGS. 1-3 and Algorithms 1, 2, and 3, although one of ordinary skill in the art may modify or omit portions of Algorithms 1, 2, and 3, or use other coarsening techniques without departing from the present disclosure.

The operations further include, at block 606, using the plurality of variant time series for a machine learning task. As described herein, variants can be used for machine learning tasks such as training a machine learning model or using a machine learning model for inference as described with reference to FIGS. 4-5. Benefits of training a machine learning model using a plurality of variants include reducing the risk of overfitting the model and increasing the model's robustness to noise. Benefits of inference using a machine learning model with an ensemble of variously coarsened variants include improved model performance. In some uses, the machine learning model may process the variant time series as described above with reference to equation [2].

Figure 7:
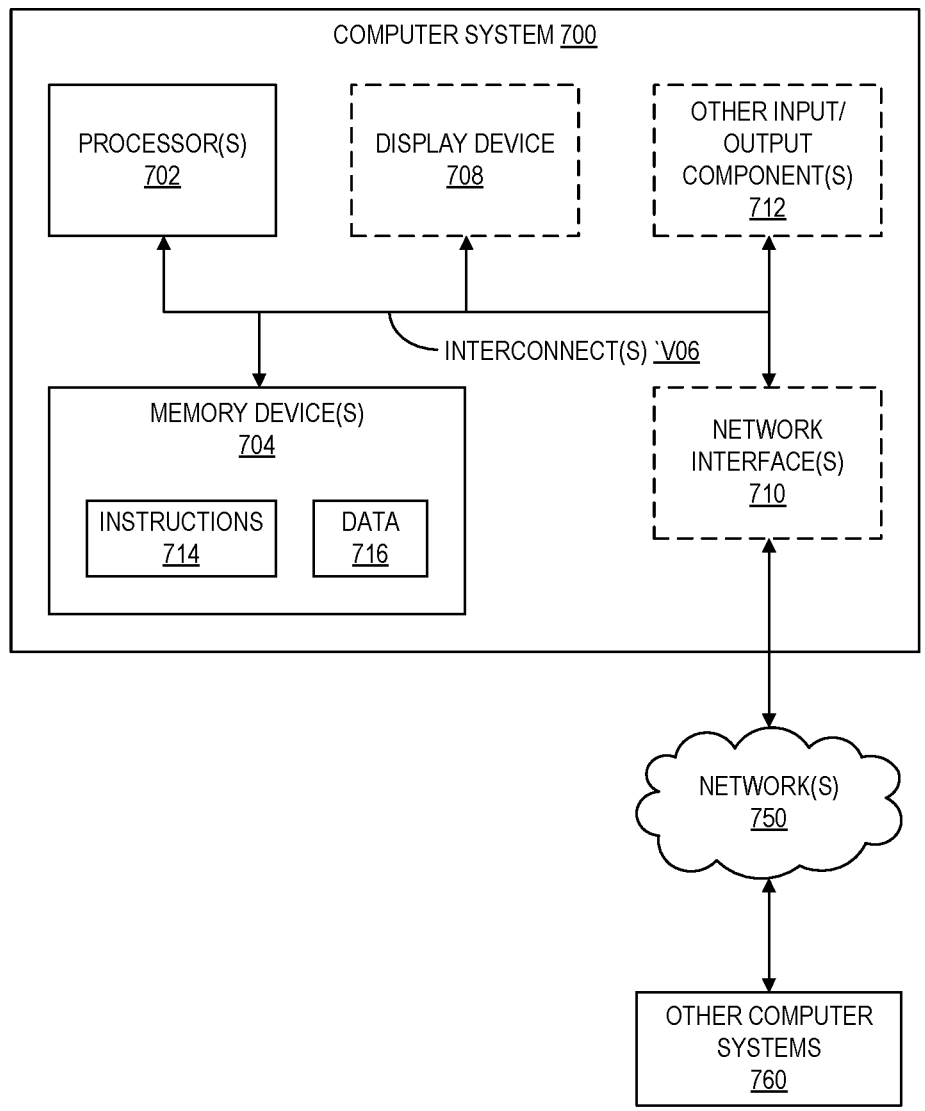
FIG. 7 is a block diagram illustrating an example computer system that may be used in some embodiments.

FIG. 7 is a block diagram illustrating an example computer system that may be used in some embodiments to implement a portion or all of the techniques for coarsening irregular time series data for use in training and or inference with ML models as described herein. As illustrated, the computer system 700 includes one or more processors 702 coupled to one or more memory devices 704 via one or more interconnects 706. The computer system 700 optionally includes display device(s) 708, network interface(s) 710, and/or other input/output ("I/O") components 712. Exemplary computer systems can range from rack- or blade-servers deployed in cloud or distributed computing environments to workstations and personal computers to mobile devices such as laptops, tablets, and smart phones. Generally, a computer system 700 can also be referred to as an electronic device.

In various embodiments, the computer system 700 may be a uniprocessor system including one processor 702 or a multiprocessor system including several processors 702 (e.g., two, four, eight, or another suitable number). Processors 702 may be any suitable processors capable of executing instructions (sometimes referred to as code). For example, in various embodiments, processors 702 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 702 may commonly, but not necessarily, implement the same ISA. In some embodiments, one or more of the processors 702 are special-purpose processors such as graphics accelerators or other custom application-specific integrated circuits that improve the performance of the training and/or inference techniques described herein.

In various embodiments, the computer system 700 may include a combination of one or more memory devices 704 of various types. The memory device(s) 704 can store instructions 714 and data 716 accessible by the processor(s) 702. Exemplary memory types include volatile memory devices (e.g., such as random-access memory ("RAM"), static RAM ("SRAM"), synchronous dynamic RAM ("SDRAM")) and non-volatile memory devices (e.g., Flash-based memory devices, magnetic-based memory devices such as disk drives, optical-based memory devices such as DVD). In the illustrated embodiment, program instructions and data implementing one or more desired functions, such as those methods, techniques, and data described above are shown stored within system memory 704 as instructions 714 and data 716.

In some embodiments, the computer system 710 includes one or more network interface(s) 710 to allow the computer system 700 to exchange instructions and or data with other computer systems 760 via one or more networks 750 (e.g., the Internet, a private intranet, etc.), such as between the computer systems illustrated in FIG. 1, for example. In various embodiments, network interface(s) 710 may support communication via any suitable wired or wireless data networks, such as Ethernet-based networks, cellular networks, satellite networks, and the like, for example. As described above, the memory device(s) 704 can store instructions 714 and associated data 716 for execution by the processor(s) 702. However, in other embodiments, program instructions and/or data may be sent or received via the network interface(s) 710.

In some embodiments, the computer system 700 includes or is coupled to one or more display devices 708 to convey information to a user (e.g., the display of an image). Exemplary display devices 708 include light-emitting diode ("LED") displays and or liquid crystal displays ("LCD").

In some embodiments, the computer system 700 includes one or more other I/O components 712. The other I/O components 712 can enable the computer system 700 to receive input from a user. Exemplary I/O components 712 include keyboards, touchscreens, push buttons, touch pads, wheel, joystick, mouse, keypad, microphones, cameras, and other sensors.

The coupling of the set of processors and other components is typically through one or more interconnects 706 of the computer system 700. The interconnect(s) 706 coordinate I/O traffic between the other components of the computer system 700. For example, the interconnects 706 can perform any necessary protocol, timing or other data transformations to convert data signals from one component (e.g., a memory device 704) into a format suitable for use by another component (e.g., a processor 702). In some embodiments, the interconnect(s) 706 may include support for devices attached through various types of peripheral buses, such as a variant of the Peripheral Component Interconnect ("PCI") bus standard or the Universal Serial Bus ("USB") standard, for example. In some embodiments, the interconnect(s) 706 can include other interconnects such as Quick-Path interconnect ("QPI") or UltraPath interconnect ("UPI"). In some embodiments, components may have dedicated interconnect(s) to other components (e.g., one or more processors 702 with a dedicated interconnect to one or more memory devices 704, for example).

Figure 8:
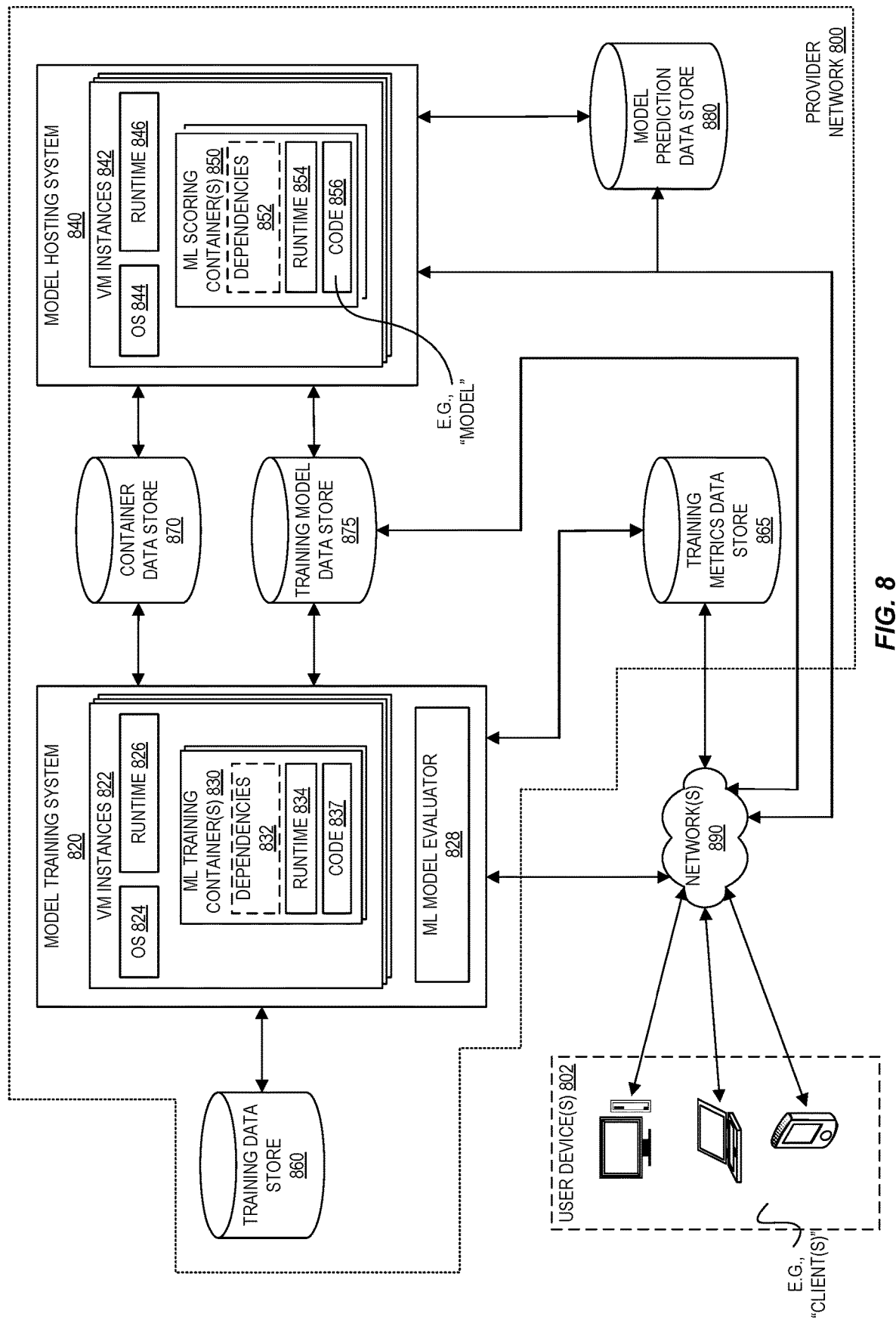
FIG. 8 illustrate an example environment for implementing some embodiments of the present disclosure.

FIG. 8 illustrate an example environment for implementing some embodiments of the present disclosure. The environment includes a provider network 800. Generally, a provider network 800 provides users with the ability to utilize one or more of a variety of types of computing-related resources such as compute resources (e.g., executing virtual machine ("VM") instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks ("CDNs"), Domain Name Service ("DNS")), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 800 may utilize one or more user accounts that are associated with a customer account, though these terms may be used somewhat interchangeably depending upon the context of use. Users may interact with a provider network 800 across one or more intermediate networks 890 (e.g., the internet) via one or more interface(s), such as through use of application programming interface ("API") calls, via a console implemented as a website or application, etc. The interface(s) may be part of, or serve as a frontend to, a control plane of the provider network 800 that includes "backend" services supporting and enabling the services that may be more directly offered to customers.

To provide these and other computing resource services, provider networks 800 often rely upon virtualization techniques. For example, virtualization technologies may be used to provide users the ability to control or utilize compute instances (e.g., a VM using a guest operating system ("OS") that operates using a hypervisor that may or may not further operate on top of an underlying host OS, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

The environment includes end user devices 802 (e.g., a PC or mobile device, such as client device), a model training system 820, a model hosting system 840, a training data store 860, a training metrics data store 865, a container data store 870, a training model data store 875, and a model prediction data store 880. A machine learning service of a provider network 800 may include one or more of these entities, such as the model hosting system 840, model training system 820, etc.

In some embodiments, users, by way of user devices 802, interact with the model training system 820 to provide data that causes the model training system 820 to train one or more machine learning models. A machine learning model, generally, may be thought of as one or more equations that are "trained" using a set of data according to an algorithm (e.g., linear regression, logistic regression, k-means clustering, principal component analysis, factorization machines, neural topic modeling, latent dirichlet allocation, gradient boosted trees, time series forecasting, image classification, etc.). In some embodiments, the model training system 820 provides ML functionalities as a web service, and thus messaging between user devices 802 and the model training system 820 (or provider network 800), and/or between components of the model training system 820 (or provider network 800), may utilize HTTP messages to transfer data in a machine-readable file format, such as eXtensible Markup Language ("XML") or JavaScript Object Notation ("JSON").

The user devices 802 can interact with the model training system 820 via a frontend of the model training system 820. For example, a user device 802 can provide a training request to the frontend that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit ("GPU") instance type, a central processing unit ("CPU") instance type, an amount of memory to allocate, a type of virtual machine instance to use for training, etc.).

In some embodiments, the container image can include one or more layers, where each layer represents an executable instruction. Some or all of the executable instructions together represent an algorithm that is used to define a machine learning model. The executable instructions (e.g., the algorithm) can be written in any programming language (e.g., Python, Ruby, C++, Java, etc.). In some embodiments, the algorithm is pre-generated and obtained by a user, via the user device 802, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 802 may provide, in the training request, an algorithm written in any programming language. The model training system 820 packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (e.g., an interactive web-based programming environment) and cause the algorithm/code to be provided—perhaps as part of a training request (or referenced in a training request)—to the model training system 820, where this algorithm/code may be containerized on its own or used together with an existing container having a machine learning framework, for example.

In some embodiments, instead of providing a container image in the training request, the user device 802 provides, in the training request, an indicator of a container image (e.g., an indication of an address or a location at which a container image is stored). For example, the container image can be stored in a container data store 870, and this container image may have been previously created/uploaded by the user. The model training system 820 can retrieve the container image from the indicated location and create a container using the retrieved container image. The container is then loaded into a virtual machine instance 822 for training a machine learning model, as described in greater detail below.

The model training system 820 can use the information provided by the user device 802 to train a machine learning model in one or more pre-established virtual machine instances 822 in some embodiments. In particular, the model training system 820 includes a single physical computing device or system or multiple physical computing devices or systems that are interconnected using one or more computing networks (not shown), where the physical computing device(s) host one or more virtual machine instances 822. The model training system 820 can handle the acquisition and configuration of compute capacity (e.g., containers, instances, etc., which are described in greater detail below) based on the information describing the computing machine on which to train a machine learning model provided by the user device 802. The model training system 820 can then train machine learning models using the compute capacity, as is described in greater detail below. The model training system 820 can automatically scale up and down based on the volume of training requests received from user devices 802 via the frontend, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an OS 824, a language runtime 826, and one or more ML training containers 830. Generally, the ML training containers 830 are logical units created within a virtual machine instance using the resources available on that instance and can be utilized to isolate execution of a task from other processes (e.g., task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (e.g., creation of new files, modification of existing files, deletion of files, etc.) are stored in the top container layer. If an ML training container 830 is deleted, the top container layer is also deleted. However, the container image(s) that form a portion of the deleted ML training container 830 can remain unchanged. The ML training containers 830 can be implemented, for example, as Linux containers ("LXC"), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (e.g., the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training. Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (e.g., execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 820 uses one or more container images included in a training request (or a container image retrieved from the container data store 870 in response to a received training request) to create and initialize an ML training container 830 in a virtual machine instance 822. For example, the model training system 820 creates an ML training container 830 that includes the container image(s) and/or a top container layer.

Prior to beginning the training process, in some embodiments, the model training system 820 retrieves training data from the location indicated in the training request. For example, the location indicated in the training request can be a location in the training data store 860. Thus, the model training system 820 retrieves the training data from the indicated location in the training data store 860. In some embodiments, the model training system 820 does not retrieve the training data prior to beginning the training process. Rather, the model training system 820 streams the training data from the indicated location during the training process. For example, the model training system 820 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (e.g., a buffer storing the retrieved portion is nearly empty), then the model training system 820 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (e.g., coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 820 as input parameters to some or all of the instructions being executed.

In some embodiments, executing the executable instructions causes the virtual machine instance 822 (e.g., the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 820 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 820 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (e.g., information indicating that N ML training containers 830 are collectively training a machine learning model and that a particular ML training container 830 receiving the configuration information is ML training container 830 number X of N), which can be included in the resulting model data. By parallelizing the training process, the model training system 820 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 820 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 820 can further provide configuration information to each ML training container 830 via the virtual machine instances 822 (e.g., information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 820 can significantly reduce the training time in some embodiments.

In some embodiments, the model training system 820 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 820 includes an ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (e.g., known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 802, can transmit a request to the model training system 820 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 820 can modify the machine learning model accordingly. For example, the model training system 820 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 820 can cause the virtual machine instance 822 to modify the execution of code stored in an existing ML training container 830 according to the data provided in the modification request. In some embodiments, the user, via the user device 802, can transmit a request to the model training system 820 to stop the machine learning model training process. The model training system 820 can then instruct the virtual machine instance 822 to delete the ML training container 830 and/or to delete any model data stored in the training model data store 875.

As described below, in some embodiments, the model data stored in the training model data store 875 is used by the model hosting system 840 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (e.g., rapid initialization of machine learning model training in ML training container(s) 830) in response to training requests.

In some embodiments, the model training system 820 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model hosting system 840, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 840 includes a single physical computing device or system or multiple physical computing devices or systems that are interconnected using one or more computing networks (not shown), where the physical computing device(s) host one or more virtual machine instances 842. The model hosting system 840 can handle the acquisition and configuration of compute capacity (e.g., containers, instances, etc.) based on demand for the execution of trained machine learning models. The model hosting system 840 can then execute machine learning models using the compute capacity, as is described in greater detail below. The model hosting system 840 can automatically scale up and down based on the volume of execution requests received from user devices 802 via a frontend of the model hosting system 840, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an OS 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (e.g., task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (e.g., creation of new files, modification of existing files, deletion of files, etc.) are stored in the top container layer. If an ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (e.g., supporting software such as libraries) needed by the code 856 in some embodiments. The runtime 854 can be defined by one or more executable instructions that form at least a portion of a container image that is used to form the ML scoring container 850 (e.g., the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (e.g., predicted or "inferred" results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 840 uses one or more container images included in a deployment request (or a container image retrieved from the container data store 870 in response to a received deployment request) to create and initialize an ML scoring container 850 in a virtual machine instance 842. For example, the model hosting system 840 creates an ML scoring container 850 that includes the container image(s) and/or a top container layer.

As described above, a user device 802 can submit a deployment request and/or an execution request to the model hosting system 840 via a frontend in some embodiments. A deployment request causes the model hosting system 840 to deploy a trained machine learning model into a virtual machine instance 842. For example, the deployment request can include an identification of an endpoint (e.g., an endpoint name, such as an HTTP endpoint name) and an identification of one or more trained machine learning models (e.g., a location of one or more model data files stored in the training model data store 875). Optionally, the deployment request also includes an identification of one or more container images stored in the container data store 870.

Upon receiving the deployment request, the model hosting system 840 initializes ones or more ML scoring containers 850 in one or more hosted virtual machine instance 842. In embodiments in which the deployment request includes an identification of one or more container images, the model hosting system 840 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 840 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 840 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 840 retrieves the identified model data file from the training model data store 875 and inserts the model data file into a single ML scoring container 850, which forms a portion of code 856. In some embodiments, the model data file is archived or compressed (e.g., formed from a package of individual files). Thus, the model hosting system 840 unarchives or decompresses the model data file to obtain multiple individual files and inserts the individual files into the ML scoring container 850. In some embodiments, the model hosting system 840 stores the model data file in the same location as the location in which the model data file was stored in the ML training container 830 that generated the model data file. For example, the model data file initially was stored in the top container layer of the ML training container 830 at a certain offset, and the model hosting system 840 then stores the model data file in the top container layer of the ML scoring container 850 at the same offset.

In embodiments in which multiple model data files are identified in the deployment request, the model hosting system 840 retrieves the identified model data files from the training model data store 875. The model hosting system 840 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 840 associates the initialized ML scoring container(s) 850 with the endpoint identified in the deployment request. For example, each of the initialized ML scoring container(s) 850 can be associated with a network address. The model hosting system 840 can map the network address(es) to the identified endpoint, and the model hosting system 840 or another system (e.g., a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 840 via a frontend, where the execution request identifies an endpoint and includes an input to a machine learning model (e.g., a set of input data). The model hosting system 840 or another system (e.g., a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 840 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or additionally, the virtual machine instance 842 transmits the output to the user device 802 that submitted the execution result via a frontend.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via a frontend (e.g., if no more trained machine learning models are needed to generate an output) or transmit the second output to a third ML scoring container 850 initialized in the same or different virtual machine instance 842 (e.g., if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (e.g., rapid initialization of ML scoring container(s) 850, rapid execution of code 856 in ML scoring container(s), etc.) in response to deployment and/or execution requests.

In some embodiments, the model hosting system 840 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model training system 820, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 820 and the model hosting system 840 depicted in FIG. 8 are not meant to be limiting. For example, the model training system 820 and/or the model hosting system 840 could also operate within a computing environment having a fewer or greater number of devices than are illustrated in FIG. 8. Thus, the depiction of the model training system 820 and/or the model hosting system 840 in FIG. 8 may be taken as illustrative and not limiting to the present disclosure. For example, the model training system 820 and/or the model hosting system 840 or various constituents thereof could implement various Web services components, hosted or "cloud" computing environments, and/or peer-to-peer network configurations to implement at least a portion of the processes described herein. In some embodiments, the model training system 820 and/or the model hosting system 840 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence ("POPs") or regional data centers.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 820 and the model hosting system 840, this is not meant to be limiting. For example, in some embodiments not shown, the training data store 860 is located internal to at least one of the model training system 820 or the model hosting system 840.

In some embodiments, the training metrics data store 865 stores model metrics. While the training metrics data store 865 is depicted as being located external to the model training system 820 and the model hosting system 840, this is not meant to be limiting. For example, in some embodiments not shown, the training metrics data store 865 is located internal to at least one of the model training system 820 or the model hosting system 840.

The container data store 870 stores container images, such as container images used to form ML training containers 830 and/or ML scoring containers 850, that can be retrieved by various virtual machine instances 822 and/or 842. While the container data store 870 is depicted as being located external to the model training system 820 and the model hosting system 840, this is not meant to be limiting. For example, in some embodiments not shown, the container data store 870 is located internal to at least one of the model training system 820 and the model hosting system 840.

The training model data store 875 stores model data files. In some embodiments, some of the model data files are comprised of a single file, while other model data files are packages of multiple individual files. While the training model data store 875 is depicted as being located external to the model training system 820 and the model hosting system 840, this is not meant to be limiting. For example, in some embodiments not shown, the training model data store 875 is located internal to at least one of the model training system 820 or the model hosting system 840.

The model prediction data store 880 stores outputs (e.g., execution results) generated by the ML scoring containers 850 in some embodiments. While the model prediction data store 880 is depicted as being located external to the model training system 820 and the model hosting system 840, this is not meant to be limiting. For example, in some embodiments not shown, the model prediction data store 880 is located internal to at least one of the model training system 820 and the model hosting system 840.

While the model training system 820, the model hosting system 840, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 802 via the one or more network(s) 890.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant ("PDA"), hybrid PDA/mobile phone, mobile phone, electronic book reader, set-top box, voice command device, camera, digital media player, and the like. In some embodiments, the model training system 820 and/or the model hosting system 840 provides the user devices 802 with one or more user interfaces, command-line interfaces ("CLI"), APIs, and/or other programmatic interfaces for submitting training requests, deployment requests, and/or execution requests. In some embodiments, the user devices 802 can execute a stand-alone application that interacts with the model training system 820 and/or the model hosting system 840 for submitting training requests, deployment requests, and/or execution requests.

In some embodiments, the network 890 includes any wired network, wireless network, or combination thereof. For example, the network 890 may be a personal area network, local area network, wide area network, over-the-air broadcast network (e.g., for radio or television), cable network, satellite network, cellular telephone network, or combination thereof. As a further example, the network 890 may be a publicly accessible network of linked networks, possibly operated by various distinct parties, such as the Internet. In some embodiments, the network 890 may be a private or semi-private network, such as a corporate or university intranet. The network 890 may include one or more wireless networks, such as a Global System for Mobile Communications ("GSM") network, a Code Division Multiple Access ("CDMA") network, a Long Term Evolution ("LTE") network, or any other type of wireless network. The network 890 can use protocols and components for communicating via the Internet or any of the other aforementioned types of networks. For example, the protocols used by the network 890 may include HTTP, HTTP Secure ("HTTPS"), Message Queue Telemetry Transport ("MQTT"), Constrained Application Protocol ("CoAP"), and the like. Protocols and components for communicating via the Internet or any of the other aforementioned types of communication networks are well known to those skilled in the art and, thus, are not described in more detail herein.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), File Transfer Protocol ("FTP"), Universal Plug and Play ("UPnP"), Network File System ("NFS"), Common Internet File System ("CIFS"), Extensible Messaging and Presence Protocol ("XMPP"), AppleTalk, etc. The network(s) can include, for example, a local area network ("LAN"), a wide-area network ("WAN"), a virtual private network ("VPN"), the Internet, an intranet, an extranet, a public switched telephone network ("PSTN"), an infrared network, a wireless network, and any combination thereof.

In embodiments utilizing a web server, the web server can run any of a variety of server or mid-tier applications, including HTTP servers, File Transfer Protocol ("FTP") servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as RAM or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc-Read Only Memory ("CD-ROM"), Digital Versatile Disk ("DVD") or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 207A-207N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining, by one or more electronic devices, an input irregular time series having a plurality of data points, wherein each data point of the plurality of data points includes a timestamp and a feature vector;
   generating, by the one or more electronic devices, a plurality of variant time series from the input irregular time series, wherein a first variant time series of the plurality of variant time series includes a first data point that is based in part on a combination of at least two data points of the input irregular time series;
   generating, by the one or more electronic devices, a first output from a neural network model based on a first variant time series of the plurality of variant time series;
   generating, by the one or more electronic devices, a second output from the neural network model based on a second variant time series of the plurality of variant time series; and
   outputting, by the one or more electronic devices, a classification vector based in part on the first output and the second output.

2. The computer-implemented method of claim 1, wherein the first output is scaled by a first weight and the second output is scaled by a second weight.

3. The computer-implemented method of claim 1, wherein the first data point of the first variant time series includes an indication of a number of data points of the input irregular time series that were combined to form the first data point.

4. A computer-implemented method comprising:
   obtaining, by one or more electronic devices, an input irregular time series having a plurality of data points wherein each data point of the plurality of data points includes a timestamp and a feature vector;
   generating, by the one or more electronic devices, a plurality of variant time series from the input irregular time series, wherein a first variant time series of the plurality of variant time series includes a first data point that is based in part on a combination of at least two data points of the input irregular time series; and
   using, by the one or more electronic devices, the plurality of variant time series for a machine learning task.

5. The computer-implemented method of claim 4, wherein the machine learning task trains a neural network model, the method further comprising:
   for each variant time series of the plurality of variant time series, processing the variant time series with the neural network model to generate an output; and
   updating a parameter of the neural network model based at least in part on the output.

6. The computer-implemented method of claim 4, wherein the machine learning task generates a prediction vector, the method further comprising:
   generating a first output from a neural network model based on a first variant time series of the plurality of variant time series;
   generating a second output from the neural network model based on a second variant time series of the plurality of variant time series; and
   outputting the prediction vector based in part on the first output and the second output.

7. The computer-implemented method of claim 6, wherein the first output is scaled by a first weight and the second output is scaled by a second weight.

8. The computer-implemented method of claim 4, wherein generating the first variant time series comprises:
   grouping the data points in the input irregular time series into a plurality of clusters, wherein a number of clusters in the plurality of clusters is less than a number of data points in the input irregular time series, wherein each cluster corresponds to a data point in the first variant time series of the plurality of variant time series;
   generating, for each cluster, a time stamp from the time stamps of the data points grouped into the cluster; and
   generating, for each cluster, a feature vector from the feature vectors of the data points grouped into the cluster.

9. The computer-implemented method of claim 4, wherein generating the first variant time series comprises:
   selecting a plurality of edges in the input irregular time series, an edge corresponding to a time between consecutive data points in the input irregular time series;
   generating, for each selected edge, a time stamp from the time stamps of the consecutive data points bounding the selected edge; and
   generating, for each selected edge, a feature vector from the feature vectors of the consecutive data points bounding the selected edge.

10. The computer-implemented method of claim 4, wherein generating the first variant time series comprises:
    generating a plurality of clusters, each cluster corresponding to a regularly spaced timestamp between an earliest timestamp of a second data point in the input irregular time series and a latest timestamp of a third data point in the input irregular time series, wherein a number of clusters in the plurality of clusters is less than a number of data points in the input irregular time series;

associating each data point in the input irregular time series with one of the plurality of clusters;

generating, for each cluster, a time stamp from the time stamps of the data points associated with the cluster; and generating, for each cluster, a feature vector from the feature vectors of the data points associated with the cluster.

11. The computer-implemented method of claim 4, wherein the first data point of the first variant time series includes an indication of a number of data points of the input irregular time series that were combined to form the first data point.

12. The computer-implemented method of claim 4, wherein the input irregular time series is one of the plurality of variant time series.

13. A system comprising:
a storage service implemented by a first one or more electronic devices; and
a machine learning service implemented by a second one or more electronic devices, the machine learning service including instructions that upon execution cause the machine learning service to:
obtain an input irregular time series having a plurality of data points from the storage service wherein each data point of the plurality of data points includes a timestamp and a feature vector;
generate a plurality of variant time series from the input irregular time series, wherein a first variant time series of the plurality of variant time series includes a first data point that is based in part on a combination of at least two data points of the input irregular time series; and
use the plurality of variant time series for a machine learning task.

14. The system of claim 13, wherein the machine learning task trains a neural network model and the machine learning service includes further instructions that upon execution cause the machine learning service to:
for each variant time series of the plurality of variant time series, process the variant time series with the neural network model to generate an output; and
update a parameter of the neural network model based at least in part on the output.

15. The system of claim 13, wherein the machine learning task generates a prediction vector, and the machine learning service includes further instructions that upon execution cause the machine learning service to:
generate a first output from a neural network model based on a first variant time series of the plurality of variant time series;

generate a second output from the neural network model based on a second variant time series of the plurality of variant time series; and
output the prediction vector based in part on the first output and the second output.

16. The system of claim 15, wherein the first output and the second output are scaled by a weight.

17. The system of claim 13, wherein to generate the first variant time series the machine learning service includes further instructions that upon execution cause the machine learning service to:
group the data points in the input irregular time series into a plurality of clusters, wherein a number of clusters in the plurality of clusters is less than the number of data points in the input irregular time series, wherein each cluster corresponds to a data point in the first variant time series of the plurality of variant time series;
generate, for each cluster, a time stamp from the time stamps of the data points grouped into the cluster; and
generate, for each cluster, a feature vector from the feature vectors of the data points grouped into the cluster.

18. The system of claim 13, wherein to generate the first variant time series the machine learning service includes further instructions that upon execution cause the machine learning service to:
select a plurality of edges in the input irregular time series, an edge corresponding to a time between consecutive data points in the input irregular time series;
generate, for each selected edge, a time stamp from the time stamps of the consecutive data points bounding the selected edge; and
generate, for each selected edge, a feature vector from the feature vectors of the consecutive data points bounding the selected edge.

19. The system of claim 13, wherein to generate the first variant time series the machine learning service includes further instructions that upon execution cause the machine learning service to:
generate a plurality of clusters, each cluster corresponding to a regularly spaced timestamp between an earliest timestamp of a second data point in the input irregular time series and a latest timestamp of a third data point in the input irregular time series, wherein a number of clusters in the plurality of clusters is less than the number of data points in the input irregular time series;
associate each data point in the input irregular time series with one of the plurality of clusters;
generate, for each cluster, a time stamp from the time stamps of the data points associated with the cluster; and
generate, for each cluster, a feature vector from the feature vectors of the data points associated with the cluster.

20. The system of claim 13, wherein the first data point of the first variant time series includes an indication of a number of data points of the input irregular time series that were combined to form the first data point.

* * * * *